United States Patent
Kandasamy et al.

(10) Patent No.: US 9,862,054 B2
(45) Date of Patent: Jan. 9, 2018

(54) ADDITIVE FRICTION STIR METHODS OF REPAIRING SUBSTRATES

(71) Applicant: Aeroprobe Corporation, Christiansburg, VA (US)

(72) Inventors: Kumar Kandasamy, Blacksburg, VA (US); Jeffrey Patrick Schultz, Blacksburg, VA (US)

(73) Assignee: Aeroprobe Corporation, Christiansburg, VA (US)

( * ) Notice: Subject to any disclaimer, the term of this patent is extended or adjusted under 35 U.S.C. 154(b) by 0 days.

(21) Appl. No.: 14/954,104

(22) Filed: Nov. 30, 2015

(65) Prior Publication Data

US 2016/0074958 A1 Mar. 17, 2016

Related U.S. Application Data

(62) Division of application No. 14/573,430, filed on Dec. 17, 2014, now Pat. No. 9,266,191.

(Continued)

(51) Int. Cl.
*B23K 20/12* (2006.01)

(52) U.S. Cl.
CPC ........ *B23K 20/1215* (2013.01); *B23K 20/128* (2013.01); *B23K 20/129* (2013.01); *B23K 20/1245* (2013.01); *B23K 20/1295* (2013.01)

(58) Field of Classification Search
CPC ...................................... B23K 20/122–20/128

(Continued)

(56) References Cited

U.S. PATENT DOCUMENTS 3,217,957 A 11/1965 Jarvie et al.
3,279,971 A 10/1966 Gardener
(Continued)

FOREIGN PATENT DOCUMENTS

CN 102120287 7/2013
CN 102120287 B 7/2013
(Continued)

OTHER PUBLICATIONS

Berbon et al., Friction stir processing: a tool to homogenize nanocomposite aluminum alloys, Scripta Materialia, vol. 44, No. 1, pp. 61-66, Jan. 5, 2001.

(Continued)

*Primary Examiner* — Kiley Stoner
(74) *Attorney, Agent, or Firm* — New River Valley IP Law, P.C.; Michele L. Mayberry; Timothy D. Nolan

(57) ABSTRACT

Additive friction stir methods for repairing substrates, coating substrates, fabricating/adding/attaching ribs, joining substrates, stiffening and enhancing structures, surface modification, enhancing surface properties, welding, coating, and extrusion are described. An additive friction stir fabrication method and system is described which may be used to fabricate and join a rib to a substrate or to repair a defect in a substrate through extrusion. The method may be carried out with or without the addition of preformed ribs. One such method involves feeding a friction-stir tool with a consumable filler material such that interaction of the friction-stir tool with the substrate generates plastic deformation at an interface between the friction-stir tool and a substrate to bond the plasticized filler and substrate together and extrude this material through a forming cavity to form a rib joined to the substrate. Further described is a system for fabricating a rib joined to a substrate through extrusion.

18 Claims, 10 Drawing Sheets

Related U.S. Application Data

(60) Provisional application No. 61/917,380, filed on Dec. 18, 2013.

(58) Field of Classification Search
USPC .............................................. 228/112.1, 2.1
See application file for complete search history.

(56) References Cited

U.S. PATENT DOCUMENTS

| | | |
|---|---|---|
| 3,292,838 A | 12/1966 | Farley |
| 3,418,196 A | 12/1968 | Luc |
| 3,444,611 A | 5/1969 | Bogart |
| 3,455,015 A | 7/1969 | Daniels et al. |
| 3,466,737 A | 9/1969 | Hanink |
| 3,495,321 A | 2/1970 | Shaff |
| 3,537,172 A | 11/1970 | Voznesensky et al. |
| 3,831,262 A | 8/1974 | Luc |
| 3,899,377 A | 8/1975 | Luc |
| 3,949,896 A | 4/1976 | Luc |
| 4,023,613 A | 5/1977 | Uebayasi et al. |
| 4,106,167 A | 8/1978 | Luc |
| 4,144,110 A | 3/1979 | Luc |
| 4,491,001 A | 1/1985 | Yoshida et al. |
| 4,625,095 A | 11/1986 | Das |
| 4,824,295 A | 4/1989 | Sharpless |
| 4,930,675 A | 6/1990 | Bedford et al. |
| 4,959,241 A | 9/1990 | Thomas et al. |
| 5,056,971 A | 10/1991 | Sartori |
| 5,249,778 A | 10/1993 | Steichert et al. |
| 5,262,123 A | 11/1993 | Thomas et al. |
| 5,330,160 A | 7/1994 | Eisermann et al. |
| 5,460,317 A | 10/1995 | Thomas et al. |
| 5,469,617 A | 11/1995 | Thomas et al. |
| 5,611,479 A * | 3/1997 | Rosen .................. B23K 20/122 228/112.1 |
| 5,637,836 A | 6/1997 | Nakagawa et al. |
| 5,697,511 A | 12/1997 | Bampton |
| 5,697,544 A | 12/1997 | Wykes |
| 5,713,507 A | 2/1998 | Holt et al. |
| 5,718,366 A | 2/1998 | Colligan |
| 5,769,306 A | 6/1998 | Colligan |
| 5,794,835 A | 8/1998 | Colligan et al. |
| 5,813,592 A | 9/1998 | Midling et al. |
| 5,826,664 A | 10/1998 | Richardson |
| 5,893,507 A | 4/1999 | Ding et al. |
| 5,971,247 A | 10/1999 | Gentry |
| 5,971,252 A | 10/1999 | Rosen et al. |
| 5,975,406 A | 11/1999 | Mahoney et al. |
| 6,021,821 A | 2/2000 | Wegman |
| 6,024,141 A | 2/2000 | Wegman |
| 6,029,879 A | 2/2000 | Cocks |
| 6,045,027 A | 4/2000 | Rosen et al. |
| 6,045,028 A | 4/2000 | Martin et al. |
| 6,050,474 A | 4/2000 | Aota et al. |
| 6,050,475 A | 4/2000 | Kinton et al. |
| 6,051,325 A | 4/2000 | Talwar et al. |
| 6,053,391 A | 4/2000 | Heideman et al. |
| 6,070,784 A | 6/2000 | Holt et al. |
| 6,119,624 A | 9/2000 | Morikawa et al. |
| 6,138,895 A | 10/2000 | Oelgoetz et al. |
| 6,168,066 B1 | 1/2001 | Arbegast |
| 6,168,067 B1 | 1/2001 | Waldron et al. |
| 6,173,880 B1 | 1/2001 | Ding et al. |
| 6,193,137 B1 | 2/2001 | Ezumi et al. |
| 6,199,745 B1 | 3/2001 | Campbell et al. |
| 6,206,268 B1 | 3/2001 | Mahoney |
| 6,213,379 B1 | 4/2001 | Takeshita et al. |
| 6,227,430 B1 | 5/2001 | Rosen et al. |
| 6,230,957 B1 | 5/2001 | Arbegast et al. |
| 6,237,829 B1 | 5/2001 | Aota et al. |
| 6,237,835 B1 | 5/2001 | Litwinski et al. |
| 6,247,633 B1 | 6/2001 | White et al. |
| 6,247,634 B1 | 6/2001 | Whitehouse |
| 6,250,037 B1 | 6/2001 | Ezumi et al. |
| 6,257,479 B1 | 7/2001 | Litwinski et al. |
| 6,259,052 B1 | 7/2001 | Ding et al. |
| 6,264,088 B1 | 7/2001 | Larsson |
| 6,273,323 B1 | 8/2001 | Ezumi et al. |
| 6,276,591 B1 | 8/2001 | Kawasaki et al. |
| 6,290,117 B1 | 9/2001 | Kawasaki et al. |
| 6,299,048 B1 | 10/2001 | Larsson |
| 6,299,050 B1 | 10/2001 | Okamura et al. |
| 6,302,315 B1 | 10/2001 | Thompson |
| 6,305,866 B1 | 10/2001 | Aota et al. |
| 6,311,889 B1 | 11/2001 | Ezumi et al. |
| 6,315,187 B1 | 11/2001 | Satou et al. |
| 6,321,975 B1 | 11/2001 | Kawasaki et al. |
| 6,325,273 B1 | 12/2001 | Boon et al. |
| 6,325,274 B2 | 12/2001 | Ezumi et al. |
| 6,328,261 B1 | 12/2001 | Wollaston et al. |
| 6,352,193 B1 | 3/2002 | Bellino et al. |
| 6,354,483 B1 | 3/2002 | Ezumi et al. |
| 6,360,937 B1 | 3/2002 | De Koning |
| 6,364,197 B1 | 4/2002 | Oelgoetz et al. |
| 6,367,681 B1 | 4/2002 | Waldron et al. |
| 6,378,264 B1 | 4/2002 | Kawasaki et al. |
| 6,378,754 B2 | 4/2002 | Aota et al. |
| 6,382,498 B2 | 5/2002 | Aota et al. |
| 6,386,425 B2 | 5/2002 | Kawasaki et al. |
| 6,398,883 B1 | 6/2002 | Forrest et al. |
| 6,413,610 B1 | 7/2002 | Nakamura et al. |
| 6,419,142 B1 | 7/2002 | Larsson |
| 6,419,144 B2 | 7/2002 | Aota |
| 6,421,578 B1 | 7/2002 | Adams et al. |
| 6,422,449 B1 | 7/2002 | Ezumi et al. |
| 6,450,394 B1 | 9/2002 | Wollaston et al. |
| 6,450,395 B1 | 9/2002 | Weeks et al. |
| 6,457,629 B1 | 10/2002 | White |
| 6,460,752 B1 | 10/2002 | Waldron et al. |
| 6,461,072 B2 | 10/2002 | Kawasaki et al. |
| 6,464,127 B2 | 10/2002 | Litwinski et al. |
| 6,468,067 B1 | 10/2002 | Ikegami |
| 6,471,112 B2 | 10/2002 | Satou et al. |
| 6,474,533 B1 | 11/2002 | Ezumi et al. |
| 6,484,924 B1 | 11/2002 | Forrest |
| 6,494,011 B2 | 12/2002 | Ezumi et al. |
| 6,497,355 B1 | 12/2002 | Ding et al. |
| 6,499,649 B2 | 12/2002 | Sayama et al. |
| 6,502,739 B2 | 1/2003 | Ezumi et al. |
| 6,513,698 B2 | 2/2003 | Ezumi et al. |
| 6,516,992 B1 | 2/2003 | Colligan |
| 6,527,470 B2 | 3/2003 | Ezumi et al. |
| 6,536,651 B2 | 3/2003 | Ezumi et al. |
| 6,543,671 B2 | 4/2003 | Hatten et al. |
| 6,572,007 B1 | 6/2003 | Stevenson et al. |
| 6,582,832 B2 | 6/2003 | Kawasaki et al. |
| 6,599,641 B1 | 7/2003 | Nakamura et al. |
| 6,648,206 B2 | 11/2003 | Nelson et al. |
| 6,669,075 B2 | 12/2003 | Colligan |
| 6,676,004 B1 | 1/2004 | Trapp et al. |
| 6,722,556 B2 | 4/2004 | Schilling et al. |
| 6,732,901 B2 | 5/2004 | Nelson et al. |
| 6,745,929 B1 | 6/2004 | Ezumi et al. |
| 6,758,382 B1 | 7/2004 | Carter |
| 6,779,704 B2 | 8/2004 | Nelson et al. |
| 6,811,632 B2 | 11/2004 | Nelson et al. |
| 6,866,181 B2 | 3/2005 | Aota et al. |
| 6,908,690 B2 | 6/2005 | Waldron et al. |
| 6,953,140 B2 | 10/2005 | Park et al. |
| 7,036,708 B2 | 5/2006 | Park et al. |
| 7,066,375 B2 | 6/2006 | Bolser |
| 7,115,324 B1 | 10/2006 | Stol et al. |
| 7,124,929 B2 | 10/2006 | Nelson et al. |
| 7,152,776 B2 | 12/2006 | Nelson et al. |
| 7,156,276 B2 | 1/2007 | Slattery |
| 7,163,136 B2 | 1/2007 | Hempstead |
| 7,240,821 B2 | 7/2007 | Talwar |
| 7,597,236 B2 | 10/2009 | Tolle et al. |
| 7,608,296 B2 | 10/2009 | Packer et al. |
| 7,624,910 B2 | 12/2009 | Barnes et al. |
| 7,661,572 B2 | 2/2010 | Nelson et al. |
| 7,732,033 B2 | 6/2010 | Aken et al. |
| 7,918,379 B2 | 4/2011 | Fujii et al. |
| 7,971,770 B2 | 7/2011 | Nakagawa et al. |

(56) References Cited

U.S. PATENT DOCUMENTS

| | | |
|---|---|---|
| 7,992,759 B2 | 8/2011 | Steel et al. |
| 8,052,034 B2 | 11/2011 | Fleming et al. |
| 8,061,579 B2 | 11/2011 | Feng et al. |
| 8,100,316 B2 | 1/2012 | Goehlich et al. |
| 8,220,693 B2 | 7/2012 | Krajewski et al. |
| 8,397,974 B2 | 3/2013 | Schultz et al. |
| 8,464,926 B2 | 6/2013 | Kou et al. |
| 8,479,970 B2 | 7/2013 | Ishibashi et al. |
| 8,632,850 B2 | 1/2014 | Schultz et al. |
| 8,636,194 B2 | 1/2014 | Schultz et al. |
| 8,678,268 B1 | 3/2014 | Obadtich et al. |
| 8,714,431 B2 | 5/2014 | Roos et al. |
| 8,875,976 B2 | 11/2014 | Schultz et al. |
| 8,893,954 B2 | 11/2014 | Schultz et al. |
| 9,205,578 B2 | 12/2015 | Schultz et al. |
| 9,266,191 B2 | 2/2016 | Kandasamy et al. |
| 9,511,445 B2 | 12/2016 | Kandasamy |
| 9,511,446 B2 | 12/2016 | Kandasamy et al. |
| 9,643,279 B2 | 5/2017 | Schulz |
| 2001/0011674 A1 | 8/2001 | Ezumi et al. |
| 2002/0011509 A1 | 1/2002 | Nelson et al. |
| 2002/0014516 A1 | 2/2002 | Nelson et al. |
| 2002/0168466 A1 | 11/2002 | Tapphorn et al. |
| 2002/0179682 A1 | 12/2002 | Schilling et al. |
| 2003/0010805 A1 | 1/2003 | Nelson et al. |
| 2003/0042292 A1* | 3/2003 | Hatten ............... B23K 20/128 228/112.1 |
| 2003/0075584 A1 | 4/2003 | Sarik et al. |
| 2003/0098336 A1 | 5/2003 | Yamashita |
| 2003/0111147 A1 | 6/2003 | Keener et al. |
| 2003/0111514 A1 | 6/2003 | Miyanagi et al. |
| 2003/0192941 A1 | 10/2003 | Ishida et al. |
| 2003/0218052 A2 | 11/2003 | Litwinski |
| 2004/0003911 A1 | 1/2004 | Vining et al. |
| 2004/0055349 A1 | 3/2004 | El-Soudani |
| 2004/0057782 A1 | 3/2004 | Okamoto et al. |
| 2004/0118899 A1 | 6/2004 | Aota et al. |
| 2004/0134972 A1 | 7/2004 | Nelson et al. |
| 2004/0149807 A1 | 8/2004 | Schilling et al. |
| 2004/0155093 A1 | 8/2004 | Nelson et al. |
| 2004/0159696 A1 | 8/2004 | Mahoney et al. |
| 2004/0195291 A1 | 10/2004 | Andersson et al. |
| 2004/0265503 A1 | 12/2004 | Clayton et al. |
| 2005/0006439 A1 | 1/2005 | Packer et al. |
| 2005/0045694 A1 | 3/2005 | Subramanian et al. |
| 2005/0045695 A1 | 3/2005 | Subramanian et al. |
| 2005/0051599 A1 | 3/2005 | Park et al. |
| 2005/0060888 A1 | 3/2005 | Park et al. |
| 2005/0121497 A1 | 6/2005 | Fuller et al. |
| 2005/0127139 A1 | 6/2005 | Slattery et al. |
| 2005/0210820 A1 | 9/2005 | Tanaka et al. |
| 2005/0242158 A1 | 11/2005 | Bolser |
| 2005/0247756 A1 | 11/2005 | Frazer et al. |
| 2005/0254955 A1 | 11/2005 | Helder et al. |
| 2006/0016854 A1 | 1/2006 | Slattery |
| 2006/0032891 A1 | 2/2006 | Flak et al. |
| 2006/0043151 A1 | 3/2006 | Stol et al. |
| 2006/0060635 A1 | 3/2006 | Slattery et al. |
| 2006/0096740 A1 | 5/2006 | Zheng |
| 2006/0208034 A1 | 9/2006 | Packer et al. |
| 2006/0289603 A1 | 12/2006 | Zettler et al. |
| 2007/0040006 A1 | 2/2007 | Charles R et al. |
| 2007/0044406 A1 | 3/2007 | Van Aken et al. |
| 2007/0075121 A1 | 4/2007 | Slattery |
| 2007/0102492 A1 | 5/2007 | Nelson et al. |
| 2007/0138236 A1 | 6/2007 | Agarwal et al. |
| 2007/0187465 A1 | 8/2007 | Eyre et al. |
| 2007/0215675 A1 | 9/2007 | Barnes |
| 2007/0241164 A1 | 10/2007 | Barnes et al. |
| 2007/0295781 A1 | 12/2007 | Hunt et al. |
| 2007/0297935 A1 | 12/2007 | Langan et al. |
| 2008/0006678 A1 | 1/2008 | Packer et al. |
| 2008/0023524 A1 | 1/2008 | Ohashi et al. |
| 2008/0041921 A1 | 2/2008 | Creehan et al. |
| 2008/0047222 A1 | 2/2008 | Barnes |
| 2008/0135405 A1 | 6/2008 | Hori et al. |
| 2008/0245517 A1* | 10/2008 | Ishikawa ............ B23K 20/1225 165/169 |
| 2009/0090700 A1 | 4/2009 | Sato et al. |
| 2009/0152328 A1 | 6/2009 | Okamoto et al. |
| 2009/0188101 A1 | 7/2009 | Durandet et al. |
| 2009/0200275 A1 | 8/2009 | Twelves et al. |
| 2009/0236028 A1 | 9/2009 | Fukuda |
| 2009/0236403 A1 | 9/2009 | Feng et al. |
| 2009/0258232 A1 | 10/2009 | Brice |
| 2009/0266870 A1 | 10/2009 | Yousefiani et al. |
| 2010/0037998 A1 | 2/2010 | Bray et al. |
| 2010/0065611 A1 | 3/2010 | Fukuda |
| 2010/0068550 A1 | 3/2010 | Watson et al. |
| 2010/0089976 A1 | 4/2010 | Szymanski et al. |
| 2010/0089977 A1 | 4/2010 | Chen et al. |
| 2010/0101768 A1 | 4/2010 | Seo et al. |
| 2010/0146866 A1 | 6/2010 | Nelson et al. |
| 2010/0176182 A1 | 7/2010 | Hanlon et al. |
| 2010/0252614 A1 | 10/2010 | Fujii et al. |
| 2010/0258612 A1 | 10/2010 | Kolbeck et al. |
| 2010/0282717 A1 | 11/2010 | Ananthanarayanan |
| 2010/0284850 A1 | 11/2010 | Hawk |
| 2010/0285207 A1 | 11/2010 | Creehan et al. |
| 2010/0297469 A1 | 11/2010 | Aota et al. |
| 2011/0062219 A1 | 3/2011 | Bezaire et al. |
| 2011/0132968 A1 | 6/2011 | Nakagawa et al. |
| 2011/0132970 A1 | 6/2011 | Nakagawa et al. |
| 2011/0227590 A1 | 9/2011 | Killian et al. |
| 2011/0266330 A1 | 11/2011 | Bruck et al. |
| 2012/0009339 A1 | 1/2012 | Creehan et al. |
| 2012/0114897 A1 | 5/2012 | Thiagarajan et al. |
| 2012/0132342 A1 | 5/2012 | Kato et al. |
| 2012/0202089 A1 | 8/2012 | Hangai et al. |
| 2012/0237788 A1 | 9/2012 | Fujii et al. |
| 2012/0273113 A1 | 11/2012 | Hovanski et al. |
| 2012/0279043 A1 | 11/2012 | Carter |
| 2012/0279271 A1 | 11/2012 | Carter |
| 2012/0279441 A1 | 11/2012 | Creehan et al. |
| 2012/0279442 A1 | 11/2012 | Creehan et al. |
| 2012/0325894 A1 | 12/2012 | Chun et al. |
| 2014/0061185 A1 | 3/2014 | Schindele |
| 2014/0130736 A1 | 5/2014 | Schultz et al. |
| 2014/0134325 A1 | 5/2014 | Schultz et al. |
| 2014/0166731 A1 | 6/2014 | Seo et al. |
| 2014/0174344 A1 | 6/2014 | Schultz et al. |
| 2015/0165546 A1 | 6/2015 | Kandasamy et al. |
| 2016/0107262 A1 | 4/2016 | Schultz et al. |
| 2016/0175981 A1 | 6/2016 | Kandasamy |
| 2016/0175982 A1 | 6/2016 | Kandasamy et al. |

FOREIGN PATENT DOCUMENTS

| | | |
|---|---|---|
| CN | 203738226 | 7/2014 |
| EP | 0453182 A | 10/1991 |
| EP | 0458774 A | 11/1991 |
| EP | 0458774 A1 | 11/1991 |
| EP | 0410104 B1 | 7/1993 |
| EP | 0597335 A | 5/1994 |
| EP | 0597335 A1 | 5/1994 |
| EP | 1206995 A2 | 5/2002 |
| EP | 1543913 B1 | 8/2007 |
| EP | 1790425 B1 | 10/2011 |
| EP | 2783976 A1 | 10/2014 |
| GB | 572789 A | 10/1945 |
| GB | 1224891 A | 3/1971 |
| GB | 2270864 A | 3/1994 |
| GB | 2306366 A | 5/1997 |
| JP | 10286682 | 10/1998 |
| JP | 11156561 | 6/1999 |
| JP | 11267857 | 10/1999 |
| JP | 2002153976 | 5/2002 |
| JP | 2002192358 | 7/2002 |
| JP | 2002255453 A | 9/2002 |
| JP | 2002283069 | 10/2002 |
| JP | 2004025296 | 1/2004 |
| JP | 2004261859 | 9/2004 |
| JP | 2004298955 | 10/2004 |
| JP | 2007222925 | 9/2007 |

(56) References Cited

FOREIGN PATENT DOCUMENTS

| | | |
|---|---|---|
| JP | 2007283317 | 11/2007 |
| JP | 2008254047 | 10/2008 |
| JP | 2010149134 | 7/2010 |
| JP | 2010279958 | 10/2010 |
| JP | 2011056582 | 3/2011 |
| JP | 2013049091 | 3/2013 |
| KR | 101256970 | 4/2013 |
| KR | 101278097 | 6/2013 |
| RU | 1393566 | 5/1988 |
| SU | 266539 A | 11/1976 |
| WO | 9310935 A1 | 6/1993 |
| WO | 0174525 | 10/2001 |
| WO | 2011137300 A2 | 11/2011 |
| WO | 2013002869 A2 | 1/2013 |
| WO | 2013095031 A1 | 6/2013 |

OTHER PUBLICATIONS

Co-pending U.S. Appl. No. 11/527,149, filed Sep. 26, 2006 (published as 2008/0041921 on Feb. 21, 2008), now abandoned.
Co-pending U.S. Appl. No. 12/792,655, filed Jun. 2, 2010 (published as 2010/0285207 on Nov. 11, 2010, now U.S. Pat. No. 8,636,194 issued on Jan. 28, 2014).
Co-pending U.S. Appl. No. 14/163,253, filed Jan. 24, 2014, Published as US 2014/0134325 on May 15, 2014, now U.S. Pat. No. 8,893,954 on Nov. 25, 2014.
Co-pending Application No. PCT/US12/32793 filed Apr. 9, 2012 (published as WO2013/002869 on Jan. 3, 2013).
Co-pending U.S. Appl. No. 12/987,588, filed Jan. 10, 2011 (published as 2012/0009339 on Jan. 12, 2012), now U.S. Pat. No. 8,632,850 issued on Jan. 21, 2014.
Co-Pending U.S. Appl. No. 13/442,201, filed Apr. 9, 2012, Published as US 2012/0279441 on Nov. 8, 2012, now U.S. Pat. No. 8,875,976 on Nov. 4, 2014.
Co-pending U.S. Appl. No. 13/442,285, filed Apr. 9, 2012 (published as 2012/0279442 on Nov. 8, 2012), now U.S. Pat. No. 8,397,974 issued on Mar. 19, 2013.
Co-pending U.S. Appl. No. 14/159,105, filed Jan. 20, 2014, Published as US 2014/0130736 on May 15, 2014, now U.S. Pat. No. 9,205,578 on Dec. 8, 2015.
Co-Pending U.S. Appl. No. 14/193,579, filed Feb. 28, 2014 (Published as US 2014/0174344 on Jun. 26, 2014).
Co-Pending U.S. Appl. No. 14/573,430, filed Dec. 17, 2014, Published as US 2015/0165546 on Jun. 18, 2015, now U.S. Pat. No. 9,266,191 on Feb. 23, 2016.
Co-Pending U.S. Appl. No. 14/640,077, filed Mar. 6, 2015.
Co-Pending U.S. Appl. No. 14/643,396, filed Mar. 10, 2015.
Co-Pending U.S. Appl. No. 14/926,447, filed Oct. 29, 2015, published as US2016/0107262 on Apr. 21, 2016.
Davis, JR, editor, Handbook of Thermal Spray Technology, ASM International (2004), pp. 138-139.
Friction Stir Tooling: Tool Materials and Designs, Chapter 2 in Friction Stir Welding and Processing, pp. 7-35, ASM International, Editors Rajiv S. Mishra & Murray W. Mahoney, 2007.
Geiger et al., "Friction stir knead welding of steel aluminum butt joints." International Journal of Machine Tools & Manufacture, vol. 48, pp. 515-521, 2008.
International Preliminary Report on Patentability of International Application No. PCT/US2012/032793, dated Oct. 8, 2013, 7 pages.
International Search Report and Written Opinion of International Application No. PCT/US2012/032793, dated Dec. 18, 2012.
Kallee et al., "Friction stir welding—invention, innovations and applications." INALCO 2001, 8th International Conference on Joints in Aluminium, Munich, Germany, 19 pages.
Metal-Matrix Composites (ASM Metals Handbook Online, ASM International, 2002), Introduction, Aluminum-Matrix Composites.
The American Welding Society. The Everyday Pocket Handbook on Welded Joint Details for Structural Applications. 2004.
Co-pending U.S. Appl. No. 15/489,389, filed Apr. 17, 2017.
Co-Pending U.S. Appl. No. 15/334,392, filed Oct. 26, 2016, published as US20170043429 on Feb. 16, 2017.
Co-Pending U.S. Appl. No. 15/347,818, filed Nov. 10, 2016, published as US 2017-0057204 on Mar. 2, 2017.

\* cited by examiner

ADDITIVE FRICTION STIR METHODS OF REPAIRING SUBSTRATES

CROSS-REFERENCE TO RELATED APPLICATIONS

The present application claims priority to and is a Divisional Application of U.S. patent application Ser. No. 14/573,430 filed Dec. 17, 2014 (published as U.S. Application Publication No. 2015/0165546 on Jun. 18, 2015), which application claims priority to and the benefit of the filing date of U.S. Provisional Application No. 61/917,380, filed Dec. 18, 2013. The disclosures of these applications are hereby incorporated by reference herein in their entireties.

BACKGROUND OF THE INVENTION

Field of the Invention

The present invention is in the field of additive manufacturing, more specifically in the field of solid state additive manufacturing. In particular, the invention is in the field of additive friction-stir fabrication of metallic substrates for addition of stiffening ribs and/or repair of defects.

Description of Related Art

Friction-stir welding is a process for solid state joining of pieces of metal at a joint region through the generation of frictional heat at the joint and opposed portions of the metal pieces by cyclical movements of a tool piece that is harder than the metal pieces (e.g., non-consumable tool). An example of this is provided by International Application Publication No. PCT/GB1992/002203. Frictional heat produced between the substrate and the tool during the process causes the opposed portions to soften, and mechanical intermixing and pressure cause the two materials to join. Typically, two materials are placed side-by-side and are friction-stir welded together at the seam between the two materials. In the metalworking arts, a number of attempts have been made to fabricate complex structures including metal sheets that are joined to one or more ribs, or similar structures. Many of these efforts have used variations of friction stir welding and linear friction welding processes to join a preformed rib to another piece of metal. As used in the context of this specification, the term preformed means any substrate (e.g., a rib) manufactured to have a predetermined thickness, shape, and size. Various methods for creating complex metal structures are described in U.S. Patent Application Publication Nos. 2009/0236403A1 and 2012/0325894A1, and U.S. Pat. Nos. 6,193,137; 6,276,591; 6,290,117; 6,413,610; 6,582,832; 6,599,641; 7,240,821; and 8,061,579.

In contrast, friction-stir fabrication, invented by the present inventors (see U.S. Pat. Nos. 8,636,194; 8,632,850; 8,875,976; and 8,397,974, the contents of which are hereby incorporated by reference in their entireties), is an additive process for joining materials along a continuous plane rather than along a seam. Additive friction-stir fabrication (FSF) processes use shear-induced interfacial heating and plastic deformation to deposit metallic coatings onto metal substrates. FSF coatings have bond strengths superior to those of thermally sprayed coatings, and have the potential to enhance corrosion resistance, enhance wear resistance, repair damaged or worn surfaces, and act as an interfacial layer for bonding metal matrix composites. In this process, the coating material, such as a metal alloy, is forced through a rotating spindle to the substrate surface. Frictional heating occurs at the filler/substrate interface due to the rotational motion of the filler material, such as a rod, and the downward force applied. The mechanical shearing that occurs at the interface acts to disperse any oxides or boundary layers, resulting in a metallurgical bond between the substrate and coating. As the substrate moves relative to the tool, the coating is extruded under the rotating shoulder of the stirring tool.

Conventional additive manufacturing techniques for manufacturing complex structures include three-dimensional printing capable of adding ribs above the surface plane. However, these conventional additive manufacturing techniques are based on melting and deposition. The solid state processes for fabricating ribs do not have finer resolution, making these processes unsuitable for efficiently manufacturing very thin ribs, with or without lower through thickness properties. Thus, there is a need in the art for new additive manufacturing techniques for manufacturing complex structures.

SUMMARY OF THE INVENTION

The present invention provides a method for fabricating stiffening ribs on metallic substrates using local seam extrusion. The method can be used with or without the addition of preformed ribs. Localized seam extrusion is accomplished using an additive friction stir process and forming die. The additive friction stir technology of the present invention provides for the production of ribs of various geometry with excellent through thickness properties, as the ribs formed by this invention are an integral part of the sheet substrate. Such methods can also be used for repairing worn surfaces or interior surfaces which are not readily accessible. The present invention also provides a system for fabricating a rib joined to a metallic/nonmetallic substrate using localized extrusion and metallurgical bonding/mechanical interlocking.

It is an object of the invention to provide for an additive friction stir method for fabricating a rib joined to a metallic substrate through extrusion, comprising providing a metallic substrate and a die assembly, optionally wherein the metallic substrate is disposed on top of the die assembly, and/or the die assembly comprises a forming cavity disposed within the die assembly; translating a rotating friction-stir tool (such as a non-consumable tool that is made of a harder material than the filler material) along the surface of the metallic substrate and/or along a vector that overlies the forming cavity; and feeding the rotating friction-stir tool with a consumable filler material such that interaction of the rotating friction-stir tool with the substrate generates a plastic deformation at an interface between the rotating friction-stir tool and the metallic substrate such that the consumable filler and metallic substrate are preferably bonded together and extruded through the forming cavity to form a rib joined to the metallic substrate. As used herein, the term "non-consumable" can mean a material which resists consumption and/or deformation when the material is exposed to particular conditions (e.g., heat and pressure, etc.) and typically refers to the stirring tool made of a material that is harder than the filler material that the tool is working with. The term "consumable" can mean a material that will deform, melt, and/or plasticize when the material is exposed to particular conditions (e.g., heat and pressure, etc.) or is worked by a tool made of a harder material than the consumable/filler/feed material. In particular embodiments, the consumable material is a filler material that can be delivered through a non-consumable tool, and plasticized and deposited at a target location when the consumable material is exposed to particular conditions.

In particular embodiments, the metallic substrate can comprise any material, such as a metal comprising any one or more of Al, Ni, Cu, Mg, Ti, or Fe, or an alloy comprising one or more of these metals. In a more particular embodiment, the metallic substrate is a sheet metal or metal plate.

In another particular embodiment, the consumable filler material takes the form of a powder, pellet, rod, or powdered-filled cylinder and can be of any material, such as a metal, an alloy, or a composite and can comprise any one or more of Al, Ni, Cu, Mg, Ti, or Fe.

In yet another embodiment, the forming cavity comprises an open end at the bottom of the die assembly such that the rib is extruded through the die assembly. In a more particular embodiment, the forming cavity comprises a closed end at the bottom of the die assembly such that extrusion of the rib terminates at the closed end.

In another embodiment a performed rib may be provided optionally within the forming cavity of the die assembly. In particular embodiments, the preformed rib may be I-shaped, L-shaped, Y-shaped, or T-shaped. In still yet another embodiment, ribs which are formed through extrusion are joined to the preformed rib.

In another embodiment, multiple metallic substrates are provided and are optionally disposed on top of the die assembly such that one or more rotating non-consumable friction-stir tools are translated over multiple substrates.

In still yet another embodiment, according to the method, multiple die assemblies comprising forming cavities are provided such that one or more rotating non-consumable friction-stir tools are translated along a substrate disposed in communication with a die assembly and optionally along a vector overlying one or more of the forming cavities. In particular embodiments, multiple die assembles are provided with preformed ribs disposed within one or more of the forming cavities and optionally the metallic substrate is disposed on top of the die assembles to provide for the joining of the ribs that are formed through extrusion with the preformed ribs. In still yet another embodiment, one or more, or multiple die assemblies are provided and are optionally arranged to provide a grid pattern for formation of the ribs.

It is another object of the invention to provide for an additive friction stir fabrication method for repairing a metallic structure, comprising providing a hollow metallic structure wherein the structure comprises a metallic substrate with an inner surface and an outer surface and a portion of the inner surface comprises a cavity; translating a rotating non-consumable friction-stir tool along the outer surface in a position overlying the cavity; and feeding the rotating non-consumable friction-stir tool with a consumable filler material such that interaction of the rotating non-consumable friction-stir tool with the outer surface generates plastic deformation at an interface between the rotating non-consumable friction-stir tool and the outer surface such that the consumable filler and metallic substrate are extruded into the cavity as a filler and optionally bonded together. In particular embodiments, the hollow metallic structure comprises a square channel, a rectangular channel, a trapezoidal channel, a circular channel, or a triangular channel. In a more particular embodiment, a backing anvil may be disposed over the portion of the inner surface comprising a cavity, wherein extrusion of the filler terminates upon reaching the backing anvil.

It is still a further object of the invention to provide a system for fabricating a rib joined to a metallic substrate through extrusion, comprising a consumable filler material, a non-consumable friction stir tool; a metallic substrate; and a die assembly comprising a forming cavity; wherein the non-consumable friction stir tool is optionally disposed above the metallic substrate, and the metallic substrate is optionally disposed above the die assembly; and wherein the non-consumable friction stir tool is configured such that it may be rotated and translated along a vector that overlies the forming cavity of the die assembly and such that the consumable filler material may be fed through the non-consumable friction stir tool. In a particular embodiment, the cavity comprises a preformed rib. In a more particular aspect, the preformed rib is I-shaped, L-shaped, Y-shaped, or T-shaped. In another embodiment, multiple metallic substrates may be optionally disposed above the forming die assembly. In still yet another embodiment, multiple die assemblies may be optionally disposed below the metallic substrate. In more particular embodiments, the multiple die assemblies comprises a preformed rib. In still a more particular embodiment, the at least one of the preformed ribs may be I-shaped, L-shaped, Y-shaped, or T-shaped.

In other aspects of the invention the preformed ribs comprise one or more grooves for interlocking the preformed rib to the substrate.

BRIEF DESCRIPTION OF THE DRAWINGS

The accompanying drawings illustrate certain aspects of embodiments of the present invention, and should not be used to limit or define the invention. Together with the written description the drawings serve to explain certain principles of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

In embodiments, the present invention provides for an additive friction stir method for fabricating a rib joined to a metallic substrate through extrusion, comprising:

providing a metallic substrate and a die assembly, wherein the metallic substrate is disposed on top of the die assembly, and the die assembly comprises a forming cavity disposed within the die assembly;

translating a rotating non-consumable friction-stir tool along the surface of the metallic substrate along a vector that overlies the forming cavity;

wherein the translating can be performed in any direction; and feeding the rotating non-consumable friction-stir tool with a consumable filler material such that interaction of the rotating non-consumable friction-stir tool with the substrate generates plastic deformation at an interface between the rotating non-consumable friction-stir tool and the metallic substrate such that the consumable filler and metallic substrate are extruded through the forming cavity and optionally bonded together to form a rib joined to the metallic substrate.

Figure 1:
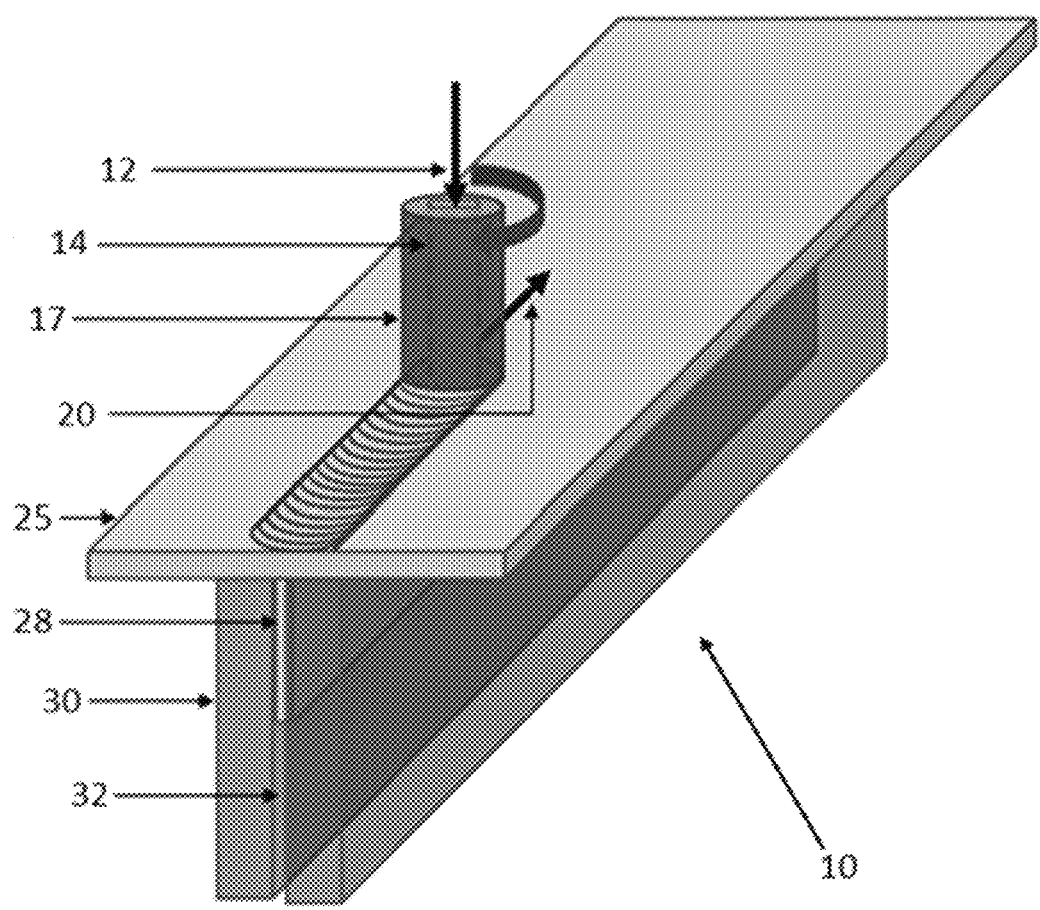
FIG. 1 is a schematic representation of an embodiment of monolithic rib extrusion on a metallic substrate using additive friction stir technology according to the invention. The forming die is semi-transparent for visual purpose only.

FIG. 1 schematically shows an exemplary rib extrusion process 10. The metallic substrate 25 on which the stiffening ribs are formed is firmly held on top of a forming die assembly 30, where the forming die or die assemblies 30 are specifically designed to meet the required rib geometry. Upon interaction of the rotating additive friction stir (AFS) tool 17 with filler material 14 with the surface of the substrate 25, frictional and adiabatic heat is generated with a severe plastic deformation at the tool-substrate interface. The temperature and plastic deformation is sufficient to form a solid state bonding between the filler 14 and the substrate 25. The setup creates a localized extrusion chamber for plastically deformed material (e.g., substrate and/or filler) to enter from above. For example, in a typical set up, forming die 30 is disposed under the substrate 25 and the forming die 30 provides the walls of the extrusion chamber. Material from the substrate 25 and/or filler material from the AFS tool 17 is plastically deformed above the forming die 30 and is extruded into the forming die 30 below to take the shape of the interior of the forming die 30 defined by the forming die walls. An increase in filler feed force 12 at this condition extrudes the plasticized filler metal into the cavity 32 or groove of the forming die assembly. Upon translation 20 the rotating AFS tool 17 is moved along the top of the substrate 25 overlying the forming cavity 32 or groove so that the plastically deformed filler 14 and metallic substrate 25 feeds the localized extrusion chamber 32 resulting in continuous extrusion of the stiffening ribs 28. Depending on the rib geometry requirements, the rib extrusion can be achieved in single or multiple steps with or without the addition of preformed ribs. The method of rib fabrication on a metallic substrate without the addition of preformed ribs is referred to in this disclosure as monolithic localized rib extrusion;
and the method of rib fabrication with addition of one or more preformed ribs is referred to in this disclosure as rib extrusion with joining. Multiple ribs and intersecting ribs can be formed on a single metallic substrate using single or multiple AFS tools, for example with the tools in tandem and/or in parallel with one another.

The friction-based rib fabrication process of the present invention may be used to join a rib or ribs onto various types of metallic substrates including but not limited to, metal substrates comprising Al, Ni, Cu, Mg, Ti, and Fe, as well as, alloys of two or more of these metals and the like. In further embodiments, the rib-fabrication process may also be used to join one or more ribs onto polymeric substrates and various composites thereof. Non-limiting examples of polymeric substrates include any deformable materials such as plastics and the like. Usually plastics are a homo-polymer or co-polymer of high molecular weight. Plastics useful to embodiments of the invention described herein include, but are not limited to, polyolefins, polyesters, nylons, vinyls, polyvinyls, polyethylene terephthalate (PET or PETE), high density polyethylene (HDPE), low density polyethylene (LDPE), polyvinyl chloride (PVC), polypropylene, polycarbonate, polyactide, acrylics, polyacrylics, polycarbonates, polystyrenes, polyurethanes, and the like. In still yet another embodiment, the rib-fabrication process may also be used to join one or more ribs onto a substrate that is a composite material comprising at least one metallic material and at least one polymeric material.

The substrates may take on a variety of forms, but are preferably in the form of a sheet or plate of any thickness (e.g., sheet metal) such as steel, aluminum, and the like.

In this additive friction stir rib fabrication process embodiment, the filler material (for example, solid bar or powder) can be fed through the rotating additive friction stir tool where frictional and adiabatic heating occurs at the filler/substrate interface due to the rotational motion of the filler and the downward force applied. The frictional and adiabatic heating that occurs at the interface results in a severe plastic deformation at the tool-metal interface. As the tool moves along a vector overlying the forming cavity (or with any relative motion between the substrate and tool), the rib can be extruded under the rotating shoulder of the tool.

One embodiment of the present invention provides a friction-based rib fabrication method, in which filler material is joined with a metallic substrate and subsequently bonded with the substrate using additive friction stir processing. The filler material may be of a similar or dissimilar material as that of substrate material. In a particular embodiment, the filler material is a metallic material. Non-limiting examples of metallic materials useful as a filler material include Al, Ni, Cu, Mg, Ti, and Fe, as well as alloys of two or more of these metals and the like. In another embodiment, the filler material is a polymeric material. Non-limiting examples of polymeric materials useful as a filler material include polyolefins, polyesters, nylons, vinyls, polyvinyls, acrylics, polyacrylics, polycarbonates, polystyrenes, polyurethanes, and the like, or any of the plastics listed elsewhere in this disclosure. In still yet another embodiment, the filler material is a composite material comprising at least one metallic material and at least one polymeric material. In other embodiments, multiple material combinations may be used for producing a composite at the interface. The composite material is then extruded into a forming cavity of a die assembly disposed below the substrate.

The filler materials can be in several forms, including but not limited to: 1) metal powder or rod of a single composition; 2) matrix metal and reinforcement powders can be mixed and used as feed material; or 3) a solid rod of matrix can be bored (e.g., to create a tube or other hollow cylinder type structure) and filled with reinforcement powder, or mixtures of metal matrix composite and reinforcement material. In the latter, mixing of the matrix and reinforcement can occur further during the fabrication process. In embodiments, the filler material may be a solid metal rod.

In embodiments, the filler material is joined with a substrate using frictional heating and compressive loading of the filler material against the substrate and a translation of the rotating friction tool. The filler material may be a consumable material, meaning as frictional heating and compressive loading are applied during the process, the filler material is consumed from its original form and is applied to the substrate. Such consumable materials can be in any form including powders, pellets, rods, and powdered-filled cylinders, to name a few. More particularly, as the applied load is increased, the filler material and substrate at the tool-substrate interface become malleable as a result of frictional and adiabatic heating and are caused to bond together under the compressive load. In embodiments, the deformed metal is then extruded into the groove of the die assembly below the substrate.

Such methods, for example, can include methods for friction-based rib extrusion comprising: (a) compressive loading of a filler material against a surface of a substrate using a rotating tool; (b) frictional and adiabatic heating of the filler material on the substrate surface using the rotating tool to form a composite between the filler material and substrate; (c) translation of the stirring tool relative to the substrate surface along a vector that overlies a forming cavity of a die assembly underlying the substrate; and/or (d) extrusion of the composite into the forming cavity.

In an embodiment, the cavity comprises an open end at the bottom of the die assembly such that the rib is extruded through the die assembly. In another embodiment, the cavity comprises a closed end at the bottom of the die assembly such that extrusion of the rib terminates at the closed end.

Figure 2:
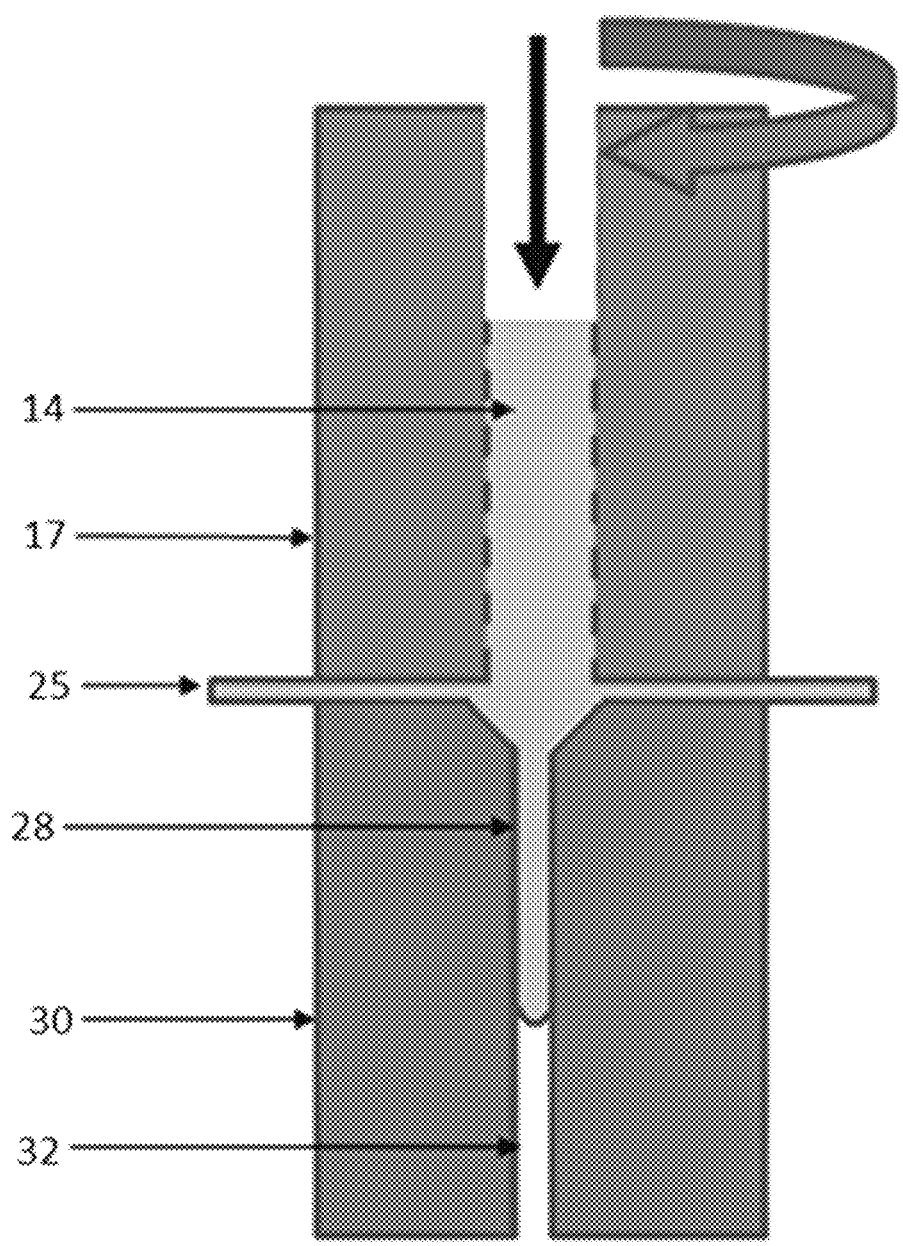
FIG. 2 is a schematic cross-sectional view of an embodiment of monolithic rib extrusion according to the invention.

The monolithic rib extrusion process is further depicted in the embodiment shown in FIG. 2, in which there is no addition of preformed ribs (e.g., the forming cavity is empty and no material is provided in the forming cavity). In this case at least the volume of filler material 14 required to form the rib is added through the tool 17. The rib formation can be with an open die 30 or alternatively closed die assembly. The closed die assembly is used to fabricate ribs with uniform height while the open die assembly is flexible and economical.

Figure 3:
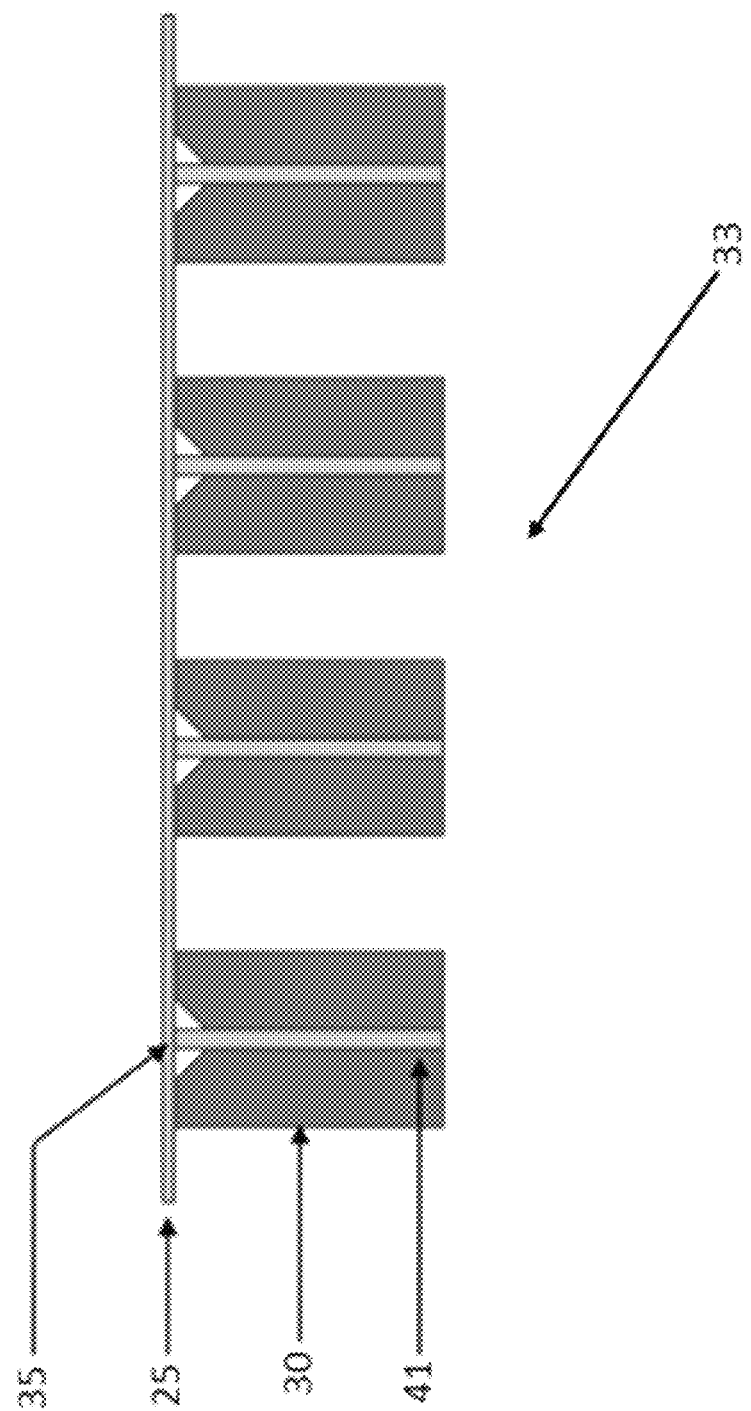
FIG. 3 is a schematic representation depicting an embodiment of a process for fabricating multiple rib formations and/or various rib preforms using the joining methods according to the invention.

Additional embodiments provide for a performed rib within the cavity of the die assembly, particularly where the extrusion of the rib is coupled with joining of the extruded rib to the preformed rib. FIG. 3 shows the rib extrusion process 33 with joining. In this embodiment the preformed ribs 41 are added in the forming grooves, resulting in coupling of rib extrusion with joining. The location of joining and seam extrusion is shown by element 35. Additionally, embodiments include the provision of multiple metallic substrates disposed on top of a single forming die assembly or multiple forming die assemblies provided under a single substrate. Since the extrusion and joining is integrated together the base metal substrate can be of multiple strips instead of one large sheet. Further, in other embodiments, multiple die assemblies are provided with preformed ribs and the metallic substrate is disposed on top of the die assembles to provide for the formation of multiple preformed ribs. During extrusion the metallic substrate is additionally joined with the preformed rib to form a preferred fillet at the intersection. In the context of this specification, it is not critical whether the substrate is provided above the die assembly, however, this arrangement may be preferred such that the extrusion can take advantage of gravity in delivering plastically deformed substrate and/or filler material to the forming cavity of the die assembly. A reverse orientation is also possible with the substrate disposed below the die assembly, or the processing can be performed sideways or at any angle in between as well.

Figure 4:
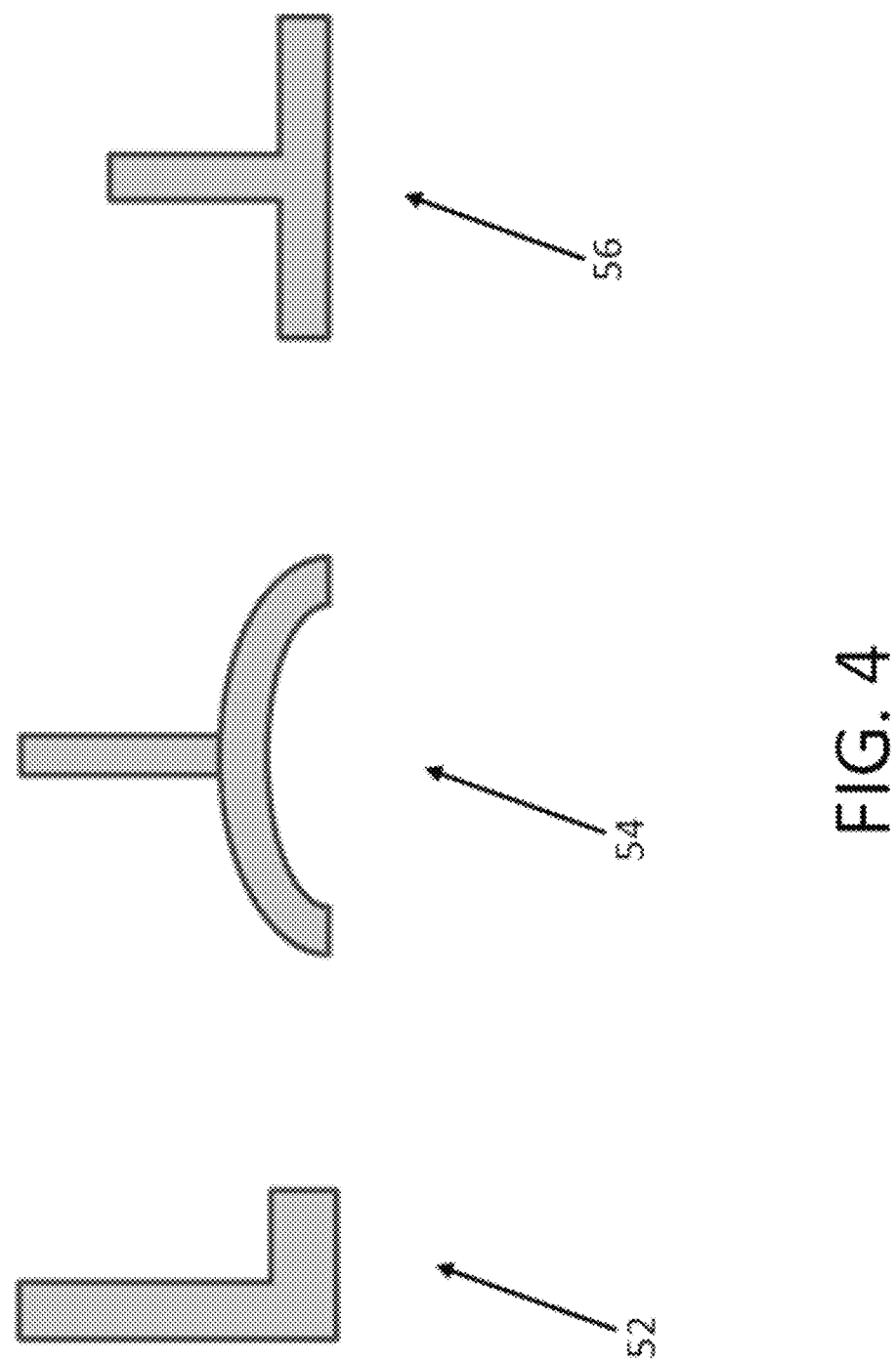
FIG. 4 is a schematic diagram showing various embodiments of preformed ribs according to the invention. Extrusion of ribs, attached or independent of a substrate, can be made with various geometries and sizes.

The preformed ribs can be of any simple extrusion geometries in addition to the geometries shown in FIG. 4. Embodiments of preformed ribs may include I-shaped, as well as L-shaped 52, Y-shaped 54, or T-shaped 56 as shown in FIG. 4.

Figure 5:
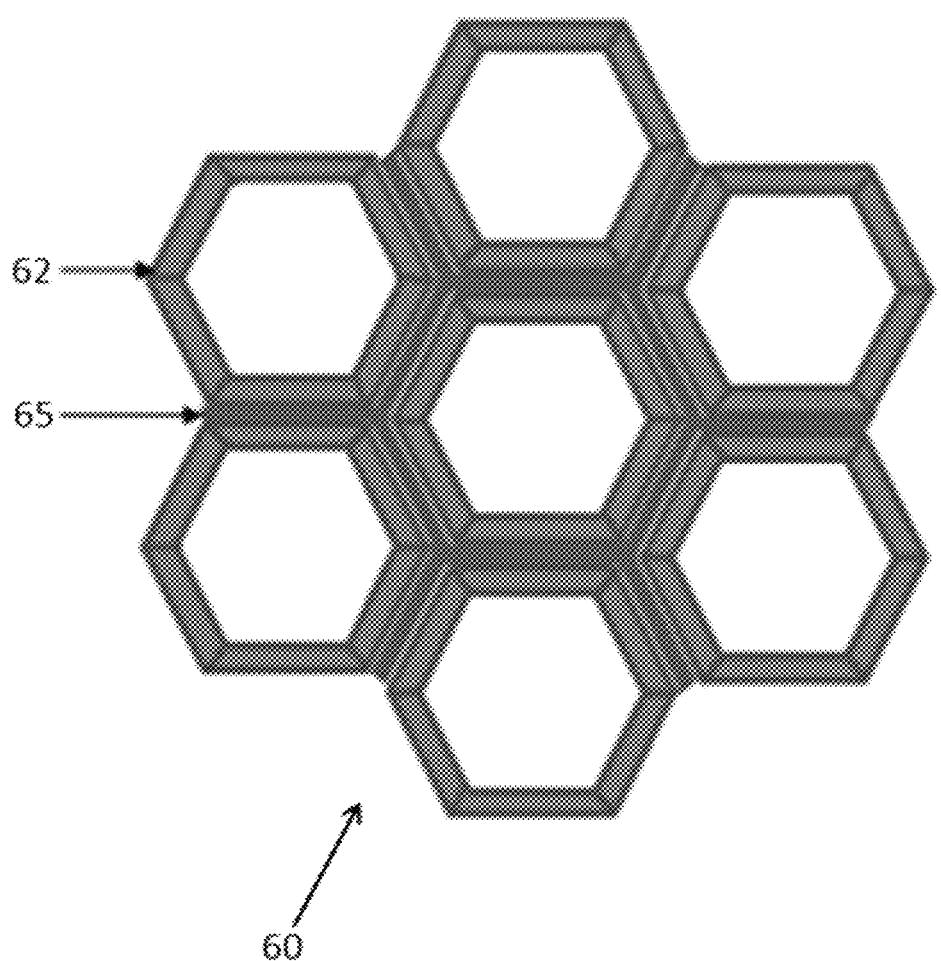
FIG. 5 is a schematic representation of a top view of an embodiment of a forming die assembly pattern for making an isometric-grid pattern stiffener according to the invention.

The forming die can be assembled to fabricate a rib pattern as shown in FIG. 5, where the forming dies 62 are assembled to make a hexagonal isometric grid pattern 60. During fabrication of the grid rib pattern, the AFS tool is traversed along the optimized path 65. Any shape forming die, including circular, square, rectangular, triangular, etc. grids can be used.

Another embodiment of the invention provides for an additive friction stir fabrication method for repairing a metallic structure, comprising:

providing metallic structure wherein the structure comprises a metallic substrate with an interior surface and an exterior surface and a portion of the interior surface comprises a cavity;

translating a rotating non-consumable friction-stir tool along the outer surface in a position overlying the cavity;

wherein the translating can be performed in any direction; and feeding the rotating non-consumable friction-stir tool with a consumable filler material such that interaction of the rotating non-consumable friction-stir tool with the outer surface generates a plastic deformation at an interface between the rotating non-consumable friction-stir tool and the outer surface such that the consumable filler and/or metallic substrate are extruded into the cavity filling the void volume and upon cooling are bonded together.

In a related embodiment, a backing anvil is provided and disposed over the portion of the inner surface comprising the cavity, wherein extrusion of the filler terminates upon reaching the backing anvil.

In related embodiments, the hollow structure may be a square channel, a rectangular channel, a trapezoidal channel, a circular channel, or a triangular channel, for example such as a passageway, pipe, rail or any shape that has features that are not accessible from the feature surface.

Figure 6:
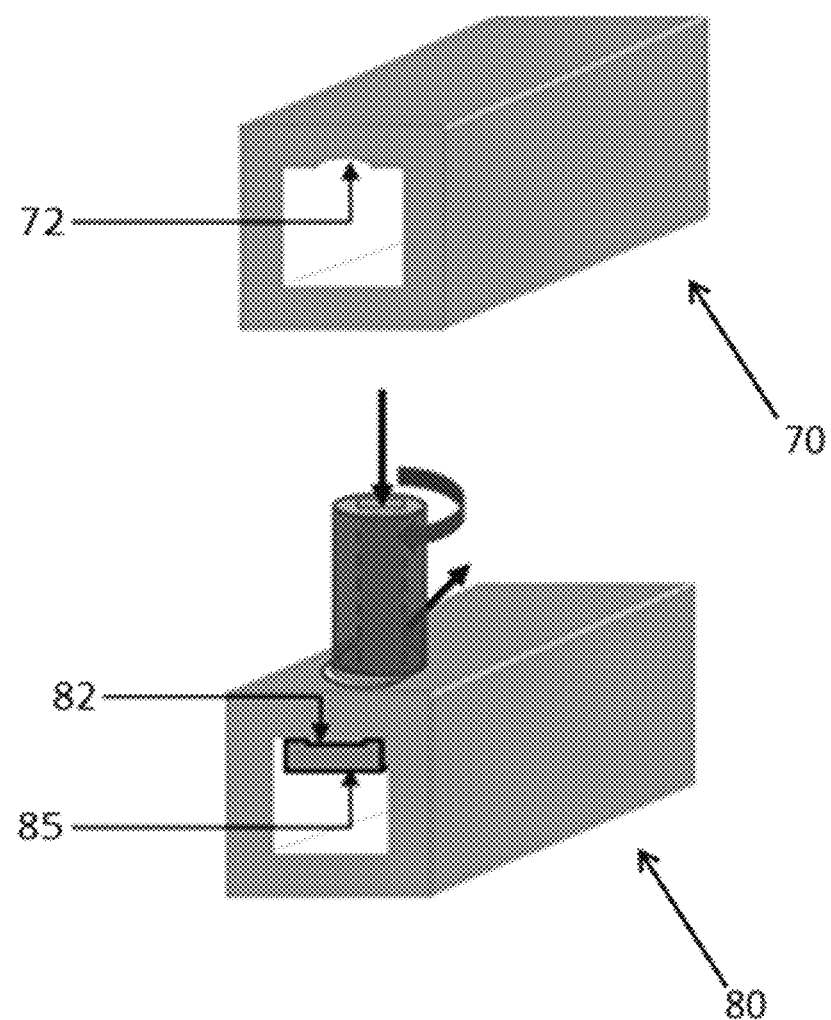
FIG. 6 is a schematic diagram showing an embodiment of an extended application of monolithic rib formation for repairing interior worn surfaces with or without the help of backing anvil according to the invention.

FIG. 6 shows an embodiment of an additive friction stir fabrication method used to repair/refill interior worn surface 72 of a square pipe/channel before repair 70 and after repair 80, wherein the additive friction stir fabrication method provides replacement material 82. Optionally, a backing anvil 85 can be used to limit the extent of extrusion of the refilled material. Similarly various geometries and parts made of different materials can be repaired. In these embodiments, the backing anvil may optionally be used for repairing applications.

Figure 7:
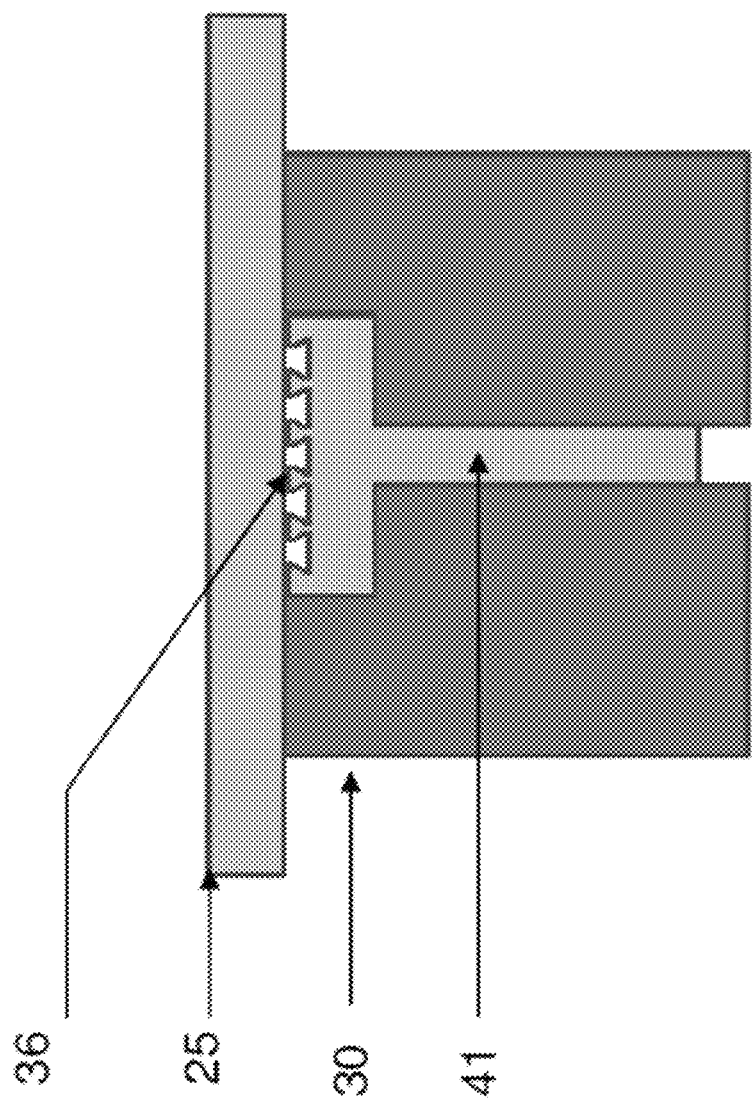
FIG. 7 is a schematic representation depicting an embodiment of a process for fabricating a rib formation by joining a preformed rib having one or more grooves for mechanical interlocking to a substrate with a joining process according to the invention.
Figure 8:
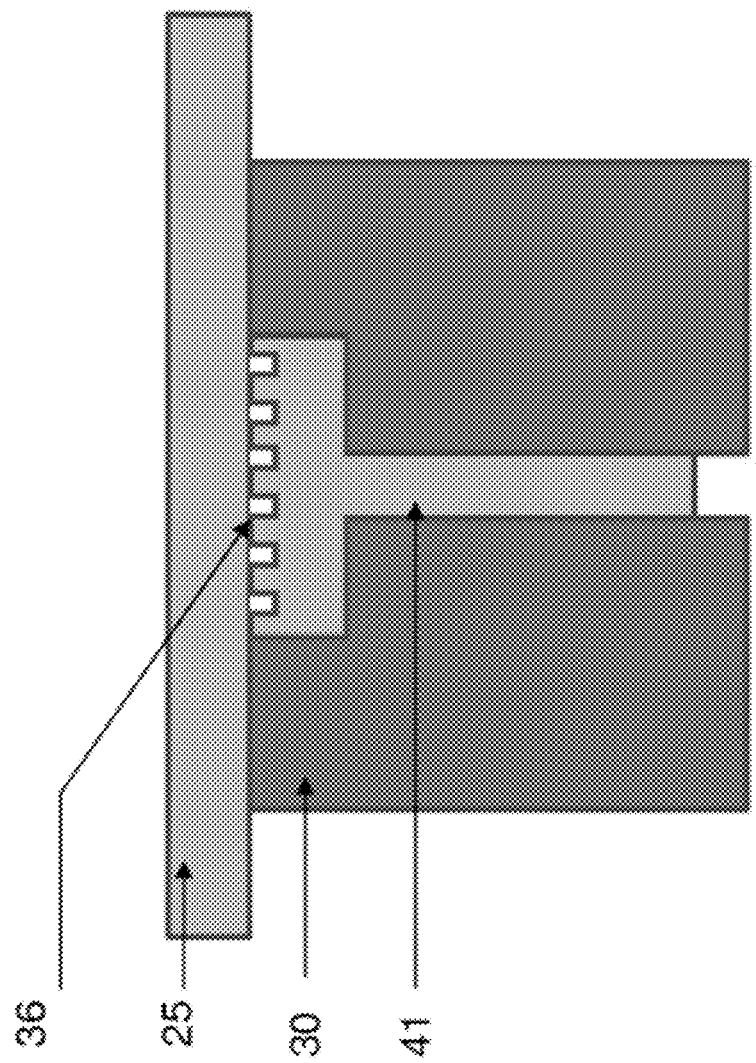
FIG. 8 is a schematic representation depicting an embodiment of a process for fabricating a rib formation by joining a preformed rib having one or more grooves for mechanical interlocking to a substrate with a joining process according to the invention.

FIGS. 7 and 8 show the method of joining of preformed ribs 41 comprising one or more interlocking grooves 36 or channels. The one or more grooves 36 can have any shape or geometry so long as the grooves 36 facilitate sufficient mechanical interlocking of the preformed rib 41 to the substrate 25 during the additive friction stir process as described herein. In a particular embodiment, the one or more grooves 36 have a cross-sectional shape that is polygonal in shape, semi-circular in shape, or a combination or shapes. Preferably, the cross sectional shape is a concave polygon. As provided in FIG. 7, in a more particular aspect, the preformed ribs 41 comprise a dovetail shaped groove 36 (e.g., groove with a concave polygon cross section). In still yet another embodiment, as provided in FIG. 8, the preformed rib 41 can comprise a square or rectangular groove 36, or the groove can have a convex polygon shape.

Figure 9:
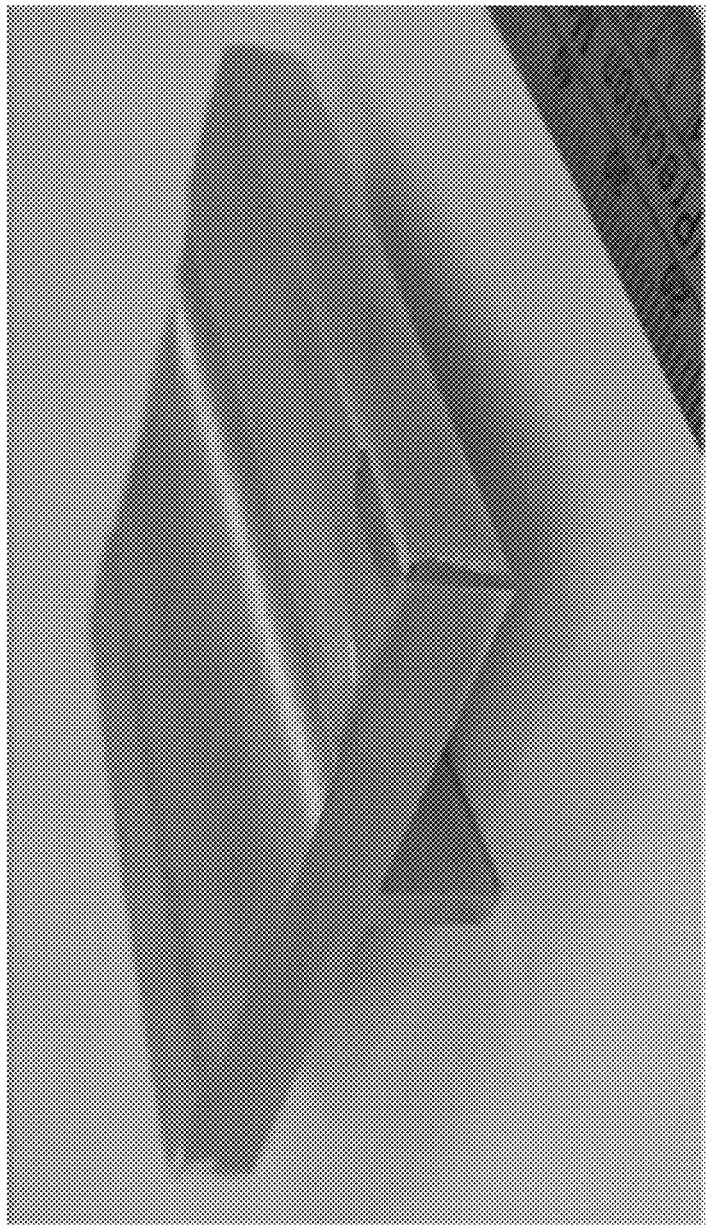
FIG. 9 is a photograph of a substrate with a rib.

FIG. 9 is a photograph showing a substrate with a rib manufactured according to the processes described herein. A representative set up for preparing the substrate with rib of FIG. 9 is shown in FIG. 1

Figure 10A:
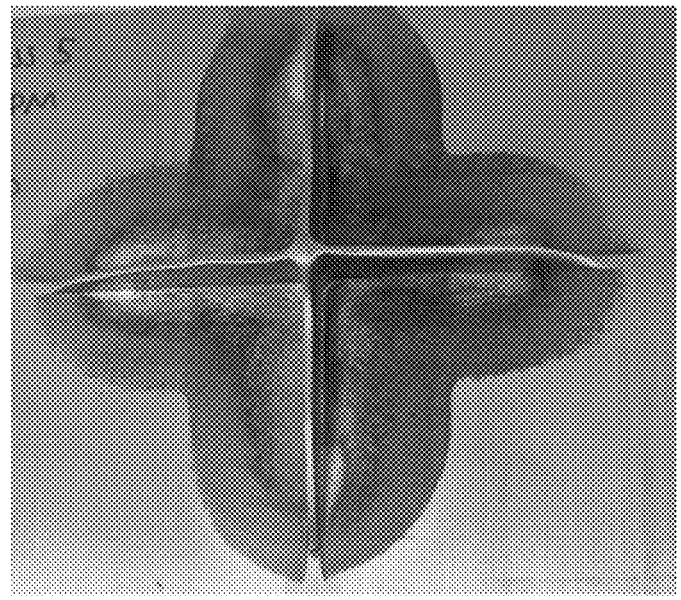
FIG. 10A is a photograph of a substrate with intersecting ribs.
Figure 10B:
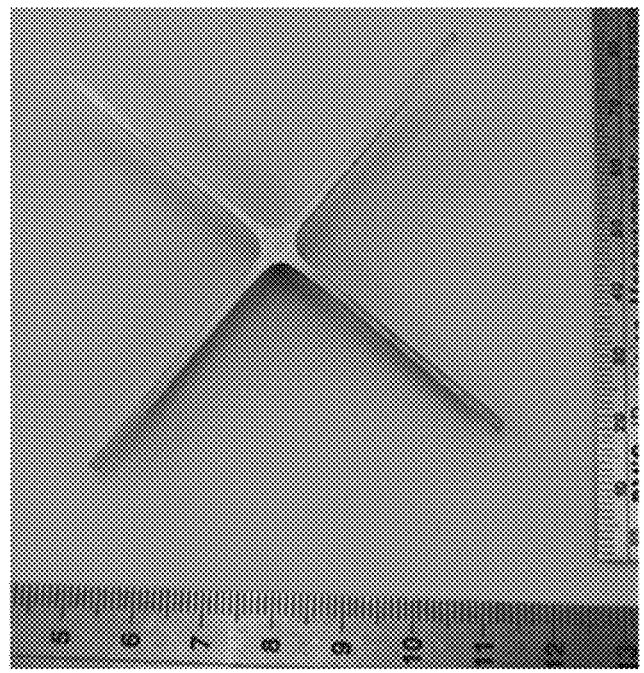
FIG. 10B is a photograph of an intersecting rib formation with a fillet.

FIGS. 10A and 10B are photographs showing intersecting ribs using the processes described herein. In particular, FIG. 10A provides an overall view showing intersecting ribs with a fillet at the intersection. FIG. 10B shows a view of the intersecting rib formation removed from the substrate to better show fillet formation.

According to the methods described herein, the preformed rib(s) 41 are held in place using a die assembly 30. The die assembly 30 is disposed such that the preformed rib(s) 41 are in communication with the substrate 25. Using dovetail shaped grooves 36, the substrate 25 and feed material providing by an additive friction stir tool can be plastically deformed and extruded into grooves 36. Due to the shape of the grooves (see FIG. 7 for example), mechanical interlocking of the substrate 25 and preformed ribs 41 occurs. In embodiments, the grooves 36 can be deformed during additive friction stir processing to instantaneously interlock the added rib 41 and substrate 25 using shear deformation and extrusion, where in such embodiments the shape of the grooves is not critical (see FIG. 8 for example). A sound mechanical interlocking is formed during the additive friction stir process at the mating interface between the grooves 36 of the preformed rib 41 and the substrate 25 due to the extrusion of substrate material and/or feed material from the additive friction stir tool into the self-interlocking grooves 36.

The rotating additive friction stir tool may take a variety of forms. For example, the tool can be configured as described in any of U.S. Published Application Nos. 2008/0041921, 2010/0285207, 2012/0009339, and 2012/0279441, 2012/0279442, as well as International Patent Application Publication No. WO2013/002869. Friction-based fabrication tooling for performing methods of the invention are preferably designed or configured to allow for a filler material to be fed through or otherwise disposed through an internal portion of a non-consumable member, which may be referred to as a throat, neck, center, interior, or through hole disposed through opposing ends of the tool. This region of the tool can be configured with a non-circular through-hole shape. Various interior geometries for the tooling are possible. With a non-circular geometry, the filler material is compelled or caused to rotate at the same angular velocity as the non-consumable portion of the tool due to normal forces being exerted by the tool at the surface of the tool throat against the feedstock. Such geometries may include a square through-hole and an elliptical through-hole as examples. In configurations where only tangential forces can be expected to be exerted on the surface of the filler material by the internal surface of the throat of the tool, the feed stock will not be caused to rotate at the same angular velocity as the tool. Such an embodiment may include a circular geometry for the cross-section of the tool in combination with detached or loosely attached feedstock, which would be expected to result in the filler material and tool rotating at different velocities. As used in this disclosure, the terms "additive friction-stir tool", "friction-stir tool", "non-consumable friction-stir tool", and "rotating non-consumable friction-stir tool" may be used interchangeably.

In embodiments the throat of the tool may be shaped with a non-circular cross-sectional shape. Further desired are tooling wherein the throat of the tool is shaped to exert normal forces on a solid, powder, or powder-filled tube type filler material disposed therein. Embodiments may also include features to ensure the frictional heating and compressive loading are of a degree sufficient to enable mixing of dispensed filler material with material of the substrate at a filler-substrate interface.

More specifically, the magnitude of force transferred from the rotating tool to the filler material is dependent on the coefficient of friction between the two. Thus, if the coefficient of friction is significantly low and the inertial force required to induce rotation of the filler material is significantly high, then the tool can rotate without inducing rotation (or with inducing rotation at a lower speed than the tool) in the cylindrical filler material. Under some circumstances during operation, differences in rotational velocity between the tool and the filler within the tool can lead to some filler material being deposited inside the tool, an accumulation of which can be problematic. Having the specific interior tool geometries described in this disclosure can reduce this issue, such as appropriately sized square-square or elliptical-elliptical shaped filler-dispenser geometries. Another way of reducing the difference in rotational velocity between the tool and the filler material is to manufacture filler material rods to fit tightly within the throat of the tool, or to otherwise tightly pack the filler material into the throat of the tool.

Any shape of the cross section of the interior of the tool that is capable of exerting normal forces on a filler material within the tool can be used. The throat surface geometry and the filler material geometry can be configured to provide for engagement and disengagement of the tool and filler material, interlocking of the tool and feed material, attachment of the tool and feed material, whether temporary or permanent, or any configuration that allows for the filler material to dependently rotate with the tool.

The interior surface shape of the tool (the throat) and the corresponding shape of the filler material may not be critical and can be constructed in a manner suitable for a particular application. Shapes of these surfaces can include, but are by no means limited to, square, rectangular, elliptical, oval, triangular, or typically any non-circular polygon. Additional shapes may include more distinctive shapes such as a star, daisy, key and key-hole, diamond, to name a few. Indeed, the shape of the outside surface of the filler material need not be the same type of shape as the surface of the throat of the tool. For example, there may be advantages from having a filler material rod with a square cross-section for insertion into a tool throat having a rectangular cross-section, or vice-versa where a filler material rod having a rectangular cross-section could be placed within a tool throat having a square cross-section in which the corners of the filler material rod could contact the sides of the square throat instead of sides contacting sides. Particular applications may call for more or less forces to be exerted on the filler material within the throat during operation of the tool. With concentric shapes and very close tolerance between the filler material and the tool certain advantages may be realized. Additionally, different shapes may be more suitable for different applications or may be highly desired due to their ease of manufacturing both the interior of the tool and corresponding filler material rods. One of ordinary skill in the art, with the benefit of this disclosure, would know the appropriate shapes to use for a particular application.

Additional embodiments of additive friction stir tools according to the invention can include a tool with a throat, where the filler material and throat are operably configured to provide for continuous feeding of the filler material through the throat of the stirring tool. In embodiments, the filler material is a powder, the throat of the tool is a hollow cylinder, and an auger shaped member disposed within the throat of the tool is used to force powder material through the throat of the tool onto the substrate. The filler material can be delivered by pulling or pushing the filler material through the throat of the stirring tool.

Additional embodiments can comprise an additive friction stir tool comprising: a non-consumable body formed from material capable of resisting deformation when subject to frictional heating and compressive loading; a throat with an internal shape defining a passageway lengthwise through the non-consumable body; an auger disposed within the tool throat with means for rotating the auger at a different velocity than the tool and for pushing powdered filler material through the tool throat; whereby the non-consumable body is operably configured for imposing frictional and adiabatic heating and compressive loading of the filler material against a substrate resulting in plasticizing of the filler material and substrate.

In embodiments, the tool and auger preferably rotate relative to the substrate. In further embodiments, the tool and auger rotate relative to one another, i.e., there is a difference in rotational velocity between the auger and the tool body. There may be some relative rotation between the filler material and the substrate, tool, or auger. The filler material and tool are preferably not attached to one another to allow for continuous or semi-continuous feeding or deposition of the filler material through the throat of the tool.

Embodiments of the rib fabrication methods according to the invention may significantly reduce labor and time requirements for preparing substrates having a desired ribbed configuration. For example, the filler material to be joined with the substrate may be applied to the substrate surface using a "push" method, where a rotating-plunging tool, e.g., auger, pushes the filler material through the rotating tool, such as a spindle. Feed material can be introduced to the tool in various ways, including by providing an infinite amount of filler material into the tool body from a refillable container in operable communication with the tool.

In embodiments, the filler material is a powdered solid and is fed through the tool body using an auger shaped plunging tool (e.g., a threaded member). In such an embodiment, the plunging tool may or may not be designed to move or "plunge" in a direction toward the substrate. For example, the threaded configuration of the auger itself is capable of providing sufficient force on the powdered feed material to direct the filler material toward the substrate for deposition, without needing vertical movement of the auger relative to the tool.

As the spindle and plunging tool rotate, compressive loading and frictional heating of the filler material can be performed by pressing the filler material into the substrate surface with the downward force (force toward substrate) and rotating speed of the additive friction stir tool.

During the rib fabrication process, it is preferred that the spindle rotate at a slightly slower rate than the auger. Alternatively, in embodiments, the spindle can also be caused to rotate faster than the auger. What is important in embodiments is that there is relative rotation between the spindle and the auger during application of the filler material. Due to the difference in rotational velocities, the threaded portion of the auger provides means for pushing the filler material through the tool body to force the material out of the tool toward the substrate. The threads impart a force on the feedstock that pushes the feed material toward the substrate much like a linear actuator or pneumatic cylinder or other mechanical force pushing on a surface of the feedstock. Even further, it may be desired in some applications to alter the rotational velocity of the tool body and/or auger during deposition of the filler material.

Deposition rate of the filler material on the substrate can be adjusted by varying parameters such as the difference in rotational velocity between the auger screw and the spindle, or modifying the pitch of the threads on the auger. If desired, for particular applications it may be warranted to control filler material temperature inside or outside of the tool body. Such thermally induced softening of the filler material provides means to increase the rate of application of the material.

In the context of this specification, the terms "filler material," "consumable material," "feed material," "feedstock" and the like may be used interchangeably to refer to the material that is applied to the substrate from the additive friction fabrication tooling. In an embodiment, a powder filler material is used in combination with an auger disposed in the tool throat for applying a constant displacement to the filler material within the throat.

The filler material (for example, powder or solid feedstock) can be fed through the rotating spindle where frictional heating occurs at the filler/substrate interface due to the rotational motion of the filler and the downward force applied. The frictional and adiabatic heating that occurs at the interface acts to plasticize the substrate and filler material at the interface resulting in a metallurgical bond between the substrate and filler. As the substrate moves along a vector overlying the forming cavity (or with any relative motion between the substrate and tool), the resulting composite can be extruded into the extrusion chamber formed in part by the forming die.

Powdered materials can be fed into the top of the spindle using a fluidized powder delivery system. Any type of powder delivery system can be used in connection with the tools and systems of the present invention. For example, a gravity-fed powder feeder system can be used, such as a hopper. One such feed system is the Palmer P-Series Volumetric Powder Feeder from Palmer Manufacturing of Springfield Ohio, which is capable of delivering feed material from 0.1-140 cu. ft. per hour, and which comprises a flexible polyurethane hopper, stainless steel massaging paddles, 304 stainless steel feed tube and auger, 90-volt DC gearhead drive motor, flexible roller chain drive system, sealed drive train and cabinet, and solid state control and pushbutton controls. The feed system preferably comprises a reservoir for holding powder filler material, a mixer for mixing powder(s) added to the reservoir, and a passageway for delivering feed material from the hopper to the throat of the tool body. As feed material is dispensed into and from the tool, more feed material is delivered into the tool from the hopper. In this manner, the feed material is continuously or semi-continuously delivered. The gravity-fed dispensing systems allow for feed material to automatically be dispensed from the hopper to the friction stir tool during use as soon as material within the tool is dispensed.

In embodiments, a mix of powder types can be added to the hopper which is operably connected with the stir tool.

Alternatively, several different types of powder can be added individually to the hopper, then mixed within the hopper and dispensed as a mixture to the friction stir tool during use. For example a metal powder and ceramic powder could be fed into the spindle at the same time, from the same or separate hoppers, and upon consolidation/deposition the filler would be a metal matrix composite (MMC). As used herein, the term "metal matrix composite" means a material having a continuous metallic phase having another discontinuous phase dispersed therein. The metal matrix may comprise a pure metal, metal alloy or intermetallic. The discontinuous phase may comprise a ceramic such as a carbide, boride, nitride and/or oxide. Some examples of discontinuous ceramic phases include SiC, $TiB_2$ and $Al_2O_3$. The discontinuous phase may also comprise an intermetallic such as various types of aluminides and the like. Titanium aluminides such as TiAl and nickel aluminides such as $Ni_3Al$ may be provided as the discontinuous phase. The metal matrix may typically comprise Al, Cu, Ni, Mg, Ti, Fe and the like.

Another embodiment of the invention provides a system for fabricating a rib joined to a metallic substrate through extrusion, comprising:
  a consumable filler material;
  a non-consumable friction stir tool;
  a metallic substrate; and
  a die assembly comprising a forming cavity;
  wherein the non-consumable friction stir tool is disposed such that it may be rotated and translated along a vector that overlies the forming cavity of the die assembly and configured such that the consumable filler material may be fed through the non-consumable friction stir tool.

Such systems can comprise a cavity with a preformed rib disposed therein. Alternatively, or in addition, the system can comprise multiple die assemblies, wherein optionally one or more or each of the multiple die assemblies comprises a preformed rib. In embodiments, the rib can be one or more preformed rib and the extruded material joins the preformed rib to the metallic substrate.

For example, in systems and methods of the invention, the preformed rib can comprise one or more grooves for interlocking the rib to the metallic substrate, and the extruded material can be deposited in the grooves of the preformed rib. In embodiments, the preformed rib can comprise multiple grooves.

In embodiments, multiple metallic substrates may be disposed above the forming die assembly, or multiple die assemblies may be disposed below the metallic substrate(s). The cavity or cavities of the die assemblies may comprise a preformed rib. The preformed rib may be I-shaped, L-shaped, Y-shaped, or T-shaped.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure, including for example non-patent literature, published patents, published patent applications, and non-published patent applications, are each individually incorporated by reference herein in their entireties and as such are intended to provide an efficient way of supplementing the enabling disclosure of this invention as well as provide background detailing the level of ordinary skill in the art.

The invention claimed is:

1. An additive friction stir fabrication method for repairing a structure, comprising:
  providing a substrate with a first surface and a second surface, wherein the second surface comprises a cavity;
  translating a rotating friction-stir tool along the first surface of the substrate;
  feeding a filler material through an opening of the rotating friction-stir tool while maintaining the opening positioned above the second surface;
  depositing the filler material and/or the substrate into the cavity; and
  providing a backing anvil in a position relative to the second surface such that the depositing terminates at the backing anvil.

2. The method of claim 1, wherein the second surface is disposed in an interior channel of the substrate, which is a square channel, a rectangular channel, a trapezoidal channel, a circular channel, or a triangular channel.

3. The method of claim 1, wherein the substrate is a pipe or a rail.

4. The method of claim 1, wherein the substrate and/or the filler material are independently chosen from plastics, homo-polymers, co-polymers, polyesters, nylons, polyvinyls such as polyvinyl chloride (PVC), polyethylene terephthalate (PET or PETE), polycarbonate, polylactide, polyacrylics, polystyrenes, polyurethanes, polyolefins such as high density polyethylene (HDPE), low density polyethylene (LDPE) and polypropylene, composites, mixtures, alloys, reinforcement materials, or a metal matrix composite comprising a metal matrix and a ceramic phase, wherein the metal matrix comprises one or more of a metal, a metal alloy, or an intermetallic, and the ceramic phase comprises a ceramic, metals, metallic materials, metal matrix composites (MMCs), ceramics, ceramic materials, steel, Al, Ni, Cu, Mg, Ti, or Fe, or an alloy comprising one or more of these metals, as well as combinations of any of these materials.

5. The method of claim 1, wherein the filler material takes the form of a powder, pellet, rod, solid bar, or powdered-filled cylinder.

6. The method of claim 1, wherein the friction stir tool comprises a throat, and the filler material is fed through the tool by pulling or pushing the filler material through the throat of the friction stir tool.

7. An additive friction stir fabrication method for repairing a structure, comprising:
  providing a substrate with an interior passageway, wherein the passageway has a wall defined by an outer surface of the substrate and an inner surface of the substrate and a portion of the inner surface of the substrate comprises a void;
  rotating and translating a friction-stir tool along the outer surface of the substrate; and feeding the rotating and translating friction-stir tool with a filler material;

wherein the translating, rotating, and feeding of the friction-stir tool causes depositing of the substrate or the filler material into the void.

8. The method of claim 7, further comprising providing a backing anvil disposed in the passageway in a manner such that the depositing terminates upon reaching the backing anvil.

9. The method of claim 7, wherein the passageway is a square channel, a rectangular channel, a trapezoidal channel, a circular channel, or a triangular channel.

10. The method of claim 7, wherein the substrate is a pipe or a rail.

11. The method of claim 7, wherein the substrate and/or the filler material are independently chosen from metals, metallic materials, metal matrix composites (MMCs), polymers, polymeric materials, ceramics, ceramic materials, steel, Al, Ni, Cu, Mg, Ti, or Fe, or an alloy comprising one or more of these metals, as well as combinations of any of these materials.

12. The method of claim 7, wherein the filler material takes the form of a powder, pellet, rod, solid bar, or powdered-filled cylinder.

13. The method of claim 7, wherein the filler material and/or the substrate are independently chosen from plastics, homo-polymers, co-polymers, or polymeric materials comprising polyesters, nylons, polyvinyls, such as polyvinyl chloride (PVC), polyacrylics, polyethylene terephthalate (PET or PETE), polylactide, polycarbonates, polystyrenes, polyurethanes, and/or polyolefins, such as high density polyethylene (HDPE), low density polyethylene (LDPE), polypropylene, composites, mixtures, reinforcement materials, or a metal matrix composite comprising a metal matrix and a ceramic phase, wherein the metal matrix comprises one or more of a metal, a metal alloy, or an intermetallic, and the ceramic phase comprises a ceramic, and independently chosen from metals, metallic materials, metal matrix composites (MMCs), ceramics, ceramic materials, steel, Al, Ni, Cu, Mg, Ti, or Fe, or an alloy comprising one or more of these metals, as well as combinations of any of these materials.

14. The method of claim 7, wherein the friction-stir tool comprises a throat and the feeding of the filler material comprises pulling or pushing the filler material through the throat of the friction-stir tool.

15. The method of claim 1, comprising forming a metallurgical, solid state, or mechanical interlocks between the deposited filler material and the substrate.

16. The method of claim 7, comprising forming a metallurgical, solid state, or mechanical interlocks between the deposited filler material and the substrate.

17. The method of claim 1, wherein the depositing provides for repair of the substrate in a manner that provides for enhanced corrosion resistance and/or wear resistance.

18. The method of claim 7, wherein the depositing provides for repair of the substrate in a manner that provides for enhanced corrosion resistance and/or wear resistance.

* * * * *